(12) United States Patent
Balamuta et al.

(10) Patent No.: US 6,755,445 B2
(45) Date of Patent: Jun. 29, 2004

(54) FITTING

(75) Inventors: John Balamuta, Elmhurst, IL (US); Richard C. Fuksa, Park Ridge, IL (US)

(73) Assignee: Thomas Industries Inc., Sheboygan, WI (US)

( * ) Notice: Subject to any disclaimer, the term of this patent is extended or adjusted under 35 U.S.C. 154(b) by 0 days.

(21) Appl. No.: 10/208,317

(22) Filed: Jul. 29, 2002

(65) Prior Publication Data

US 2004/0017083 A1 Jan. 29, 2004

(51) Int. Cl.$^7$ ................................................ F16L 19/00
(52) U.S. Cl. .................. 285/357; 285/12; 285/409; 285/410
(58) Field of Search .................. 285/12, 357, 409, 285/410

(56) References Cited

U.S. PATENT DOCUMENTS

| | | | | |
|---|---|---|---|---|
| 2,314,002 A | * | 3/1943 | Lusher et al. | 29/890.15 |
| 2,479,447 A | * | 8/1949 | Wiltse | 285/231 |
| 2,900,199 A | * | 8/1959 | Logan | 277/614 |
| 4,544,187 A | * | 10/1985 | Smith | 285/256 |
| 4,573,717 A | * | 3/1986 | Peacock | 285/365 |
| 4,586,733 A | * | 5/1986 | Anderson, Jr. | 285/12 |
| 4,800,916 A | * | 1/1989 | Lakey | 137/343 |
| 4,817,997 A | * | 4/1989 | Ingram | 285/256 |
| 5,375,887 A | * | 12/1994 | Johnson | 285/12 |
| 5,546,978 A | * | 8/1996 | Parker | 137/315.01 |
| 5,984,375 A | * | 11/1999 | Merrett | 285/253 |
| 6,047,997 A | * | 4/2000 | Olivier | 285/333 |
| 6,073,969 A | * | 6/2000 | Zimmerly | 285/12 |
| 6,161,874 A | * | 12/2000 | Yang | 285/12 |
| 6,450,542 B1 | * | 9/2002 | McCue | 285/12 |

FOREIGN PATENT DOCUMENTS

| | | | |
|---|---|---|---|
| GB | 282 210 | * 12/1927 | 285/357 |

OTHER PUBLICATIONS

Ceramseal, A Division of Ceram Tec; Webpage at www.ceramaseal.com; Technical Reference—Installation Options: ISO NW Flange/NPT Thread; Showing ISO NW Flange, ISO–NWFlang Assembly, and NPT Thread; printed Feb. 18, 2002; p. 1 of 2.

Welch Vacuum, Thomas Industries; Webpage at www.welchvacuum.com; ISO Modular Piping and Inlet and Exhaust Connectors; printed Feb. 18, 2002; p. 1 of 9.

Vacuubrand, Isolation Valves Solenoid Operated; p. 67 of a supply catalog; admitted prior art.

* cited by examiner

*Primary Examiner*—Lynne H. Browne
*Assistant Examiner*—James M. Hewitt
(74) *Attorney, Agent, or Firm*—Quarles & Brady LLP

(57) ABSTRACT

A fitting for coupling a pump attachment to the inlet or discharge port of a pump or compressor has an annular body with an externally threaded nipple at one end and a circular flange at the other end. An axial aperture extends between the ends through openings at the nipple and the flange. The opening at the flange is internally threaded and begins at a recess in the flange. The threaded opening is of a standard ISO rated size complementary to the threaded nipple. A coupler kit is also disclosed having components to connect the device to the pump either in a mating flange connection using a hinge clamp or a threaded connection using a hose barb having a threaded end that threads into the opening in the fitting.

5 Claims, 3 Drawing Sheets

FITTING

CROSS-REFERENCE TO RELATED APPLICATIONS

Not applicable.

STATEMENT OF FEDERALLY SPONSORED RESEARCH OR DEVELOPMENT

Not applicable.

BACKGROUND OF THE INVENTION

The present invention relates to a fitting for a pump and in particular to a vacuum fitting alternatively providing either a standard threaded or mating flange type connection.

Hoses and air operated devices are connected to pumps and compressors via fittings. The fittings provide a union or couple between the pump and the pump attachment so that pressurized air can pass therebetween. The size of the fittings are standardized by the International Organization for Standardization (ISO) so that they mate standard pump inlet and discharge ports to standardized ends of the pump attachment.

In the vacuum arts it is conventional for the fitting to have one end that threads into a threaded inlet port and an opposite flanged end with an axial opening running through the ends. A flanged hose member is brought in facewise abutting relation with the face of the fitting flange and joined by a hinged clamp. It is also common for vacuum pumps to be connected to hoses via a hose barb. Conventional hose barbs have one threaded end that threads into the air port of the pump and one or more flared "barbs" at the opposite end over which the appropriately sized hose fits tightly.

In either case, it is important to establish an air tight connection at the flanges and at the interface of the fitting and the pump. Commonly a resilient seal is disposed between the mating flanges to improve the seal between the flanges. The fitting is threaded very tightly to the inlet port often with a thread sealing tape or compound applied to the threads and is customarily left connected to the pump in a semi-permanent connection.

As mentioned, however, there are different standards for coupling a pump attachment to a pump and therefore using conventional techniques it is sometimes necessary to remove a tightly fastened flange fitting from the pump to be substituted by a hose barb. Buying additional pumps can be an expensive option and switching is fittings takes time and could result in improper seals.

Thus, an improved fitting is needed that permits rapid air-tight coupling of alternative standard pump attachments.

SUMMARY OF THE INVENTION

The present provides a unique fitting for connecting a hose or other pump attachment to a pump in either a mating flange connection or a threaded connection.

In one aspect the invention provides a fitting having an annular body with an externally threaded nipple at one end and a circular flange at the other end. An axial aperture extends between the ends through openings at the nipple and the flange. The opening at the flange is internally threaded.

In a preferred form the diameter of the threaded nipple is complementary to the diameter of the internally threaded opening at the flange, both of which are a standard ISO rated size.

Another aspect of the invention is a coupler kit containing a fitting as described above as well as a clamp and a hose barb for alternately connecting a device to the fitting either with a mating flange or with a threaded connection. The hinge clamp is used to connect the fitting to a mating flange member. The hinge clamp has semi-circular channel sections hinged together at one end. The channel sections together define a circular channel sized to receive the fitting flange and the flange of the mating member. Preferably, a resilient seal fits between opposing faces of the mating flanges for improved sealing. A hose barb is included for connecting a hose to the fitting in a threaded connection. The hose barb has a barbed end and an opposite threaded end sized to engage the internally threaded opening of the fitting within the flange.

The invention thus provides a fitting for a pump or compressor that can be connected to an air hose either by a standard mating flange connection or a standard threaded connection without removing the fitting from the pump (or compressor). The fitting can be tightly secured to an inlet or discharge port of the pump (or compressor) and alternatively mated to a hose flange or hose barb without breaking the seal between the fitting and the pump. The fitting is sized to work with standard sized hose barbs and flange connections.

These and other advantages of the invention will be apparent from the detailed description and drawings.

DETAILED DESCRIPTION OF THE PREFERRED EMBODIMENT

The present invention provides an improved fitting preferably for coupling a hose to the inlet of a pump or compressor, preferably a vacuum pump, using either a threaded hose barb or mating flanges.

Figure 1:
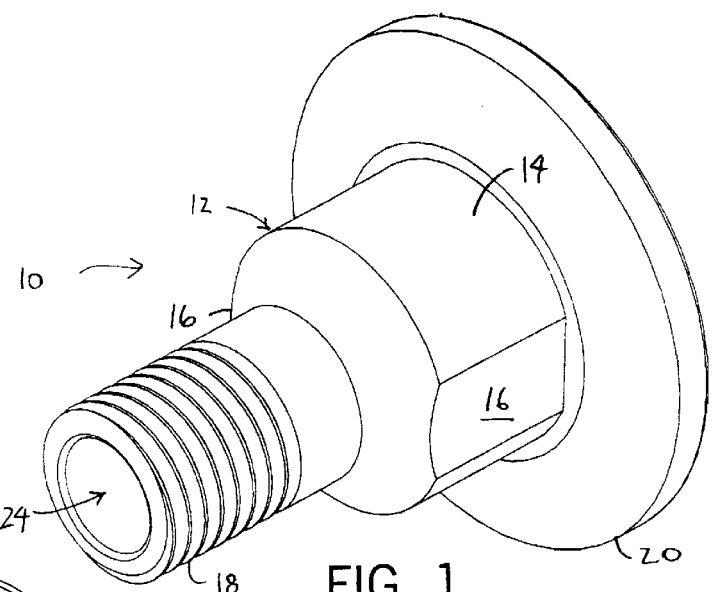
FIG. 1 is a perspective view of a fitting of the present invention.
Figure 2:
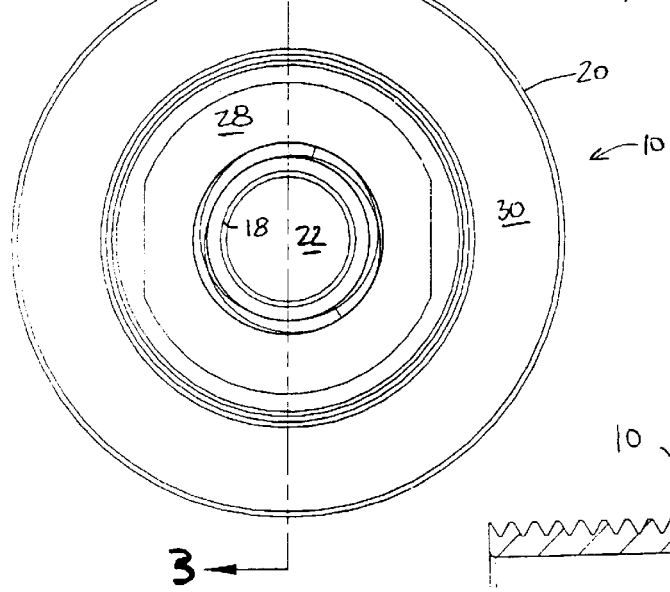
FIG. 2 is an end view of the fitting of FIG. 1.
Figure 3:
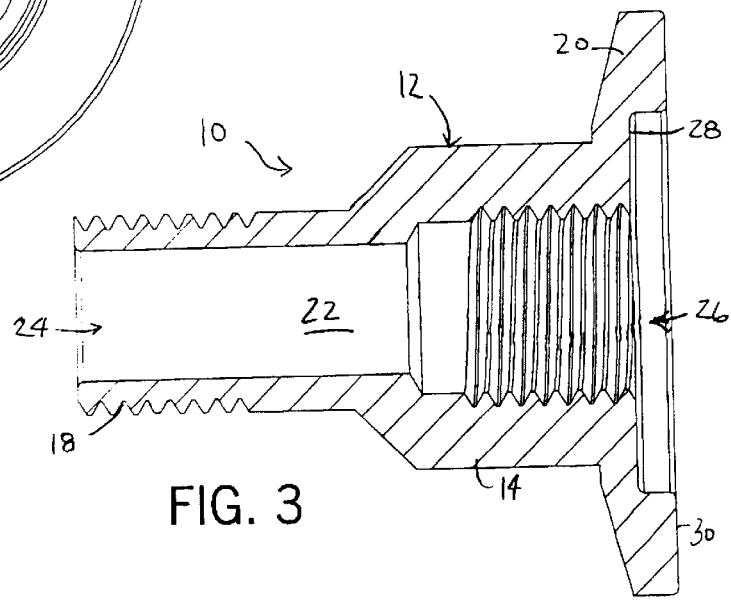
FIG. 3 is a side cross-sectional view taken along line 3—3 of FIG. 2.

Referring to FIGS. 1–3, the invention provides a vacuum fitting 10 having an annular body 12 with a middle section 14 having opposite flats 16 and an externally threaded nipple 18 of decreased diameter at one end and a circular flange 20 at the other end. An axial aperture 22 extends between the ends through openings 24 and 26 at the nipple 18 and the flange 20, respectively. The opening 26 of the flange 20 has internal threads and is spaced axially from an outer face of the flange by a central recess 28, such that the flange 20 defines an annular disk 30 at its outer face.

Figure 6:
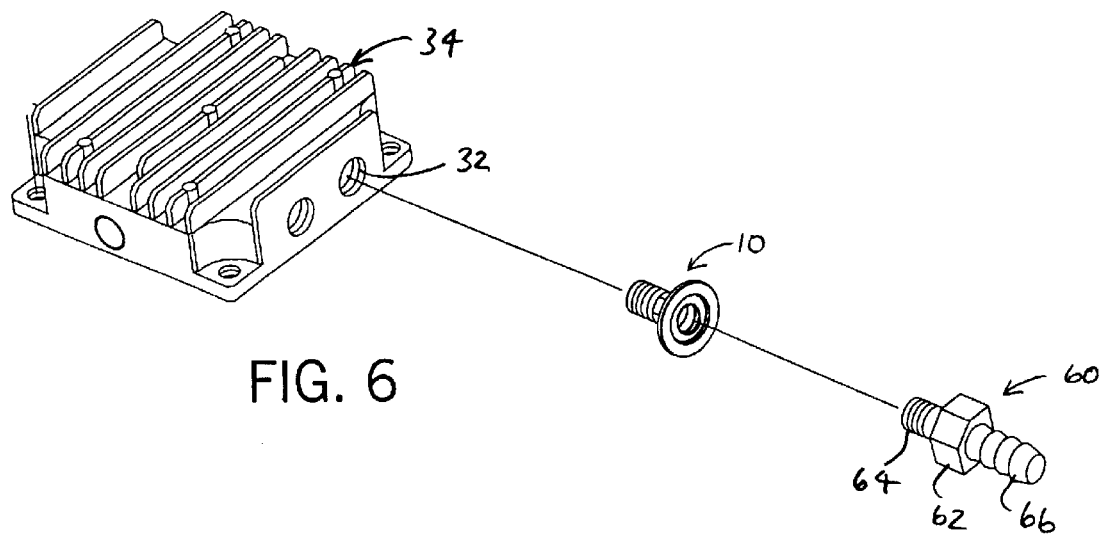
FIG. 6 is an exploded assembly view of a vacuum pump, the fitting of FIG. 1 and a threaded hose barb.

The nominal and pitch diameters of the internally threaded opening 26 are designed to be equivalent to that of a standard ISO sized port 32 of a pump 34, as shown in FIG. 6. The nipple 18 is complementary to the internally threaded opening 26 since it is designed to thread into the standard sized port 32. For example, the nipple 18 and the flange opening 26 may each be ⅜ inch nominally in diameter, or a different size (e.g., ¼ inch), depending on what size is needed for a particular application.

Figure 4:
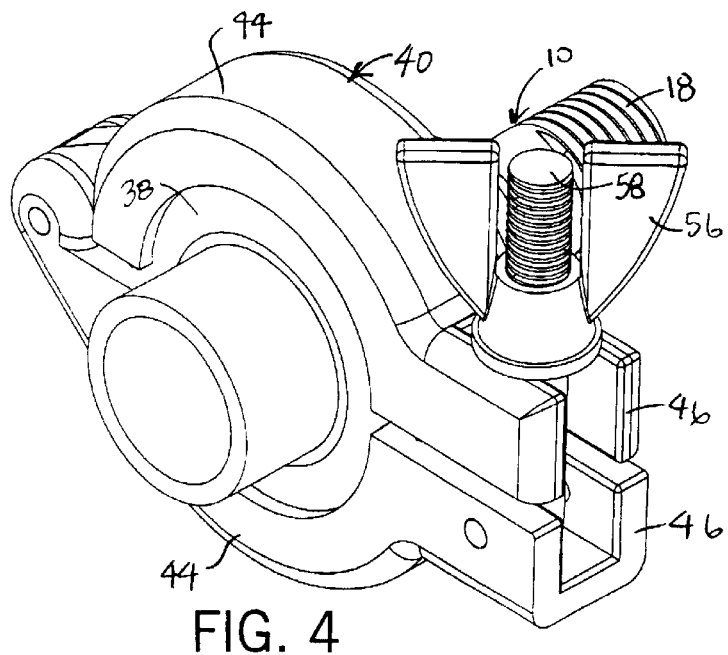
FIG. 4 is a perspective view of a mating flange coupler assembly having the fitting of FIG. 1.
Figure 5:
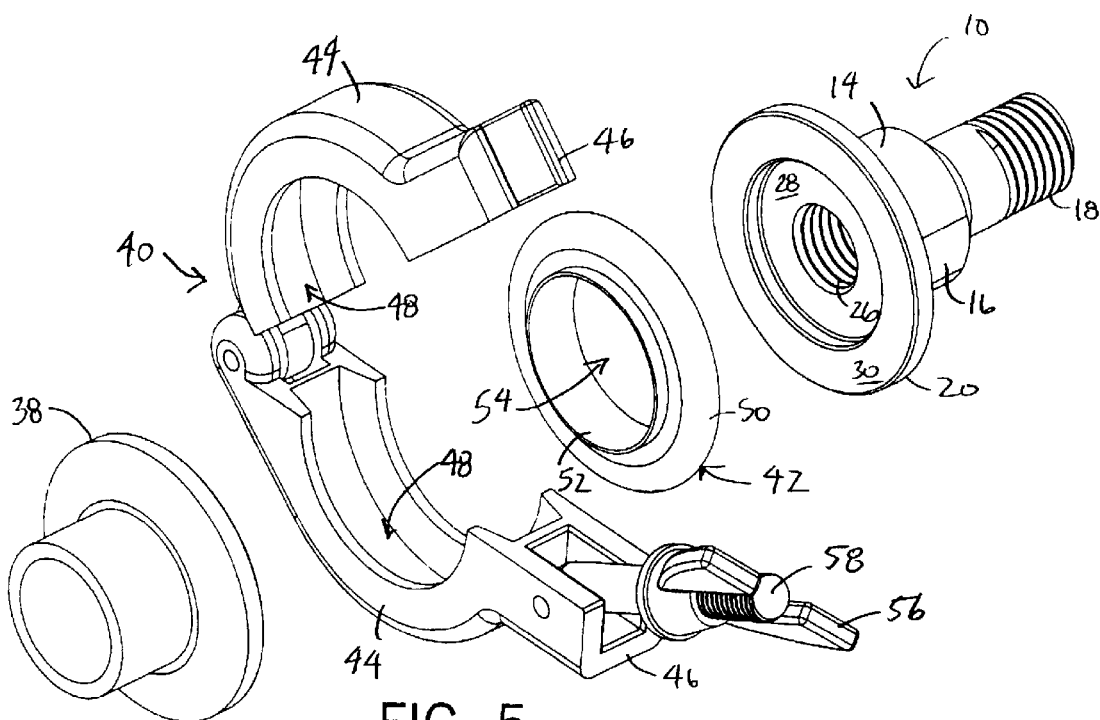
FIG. 5 is an exploded perspective view of the coupler assembly of FIG. 4.

The diameter of the flange 20 itself is also a standard ISO rated size, for example NW-25 (having a 40 mm outer diameter), such that the fitting 10 can be coupled, in the case of a vacuum pump, between the inlet port 32 and an intake hose in a standard mating flange connection. Referring to FIGS. 4 and 5, the flange 20 is preferably joined to a hose flange 38, of the same outer dimension as the fitting flange 20, with a hinge clamp 40 and a ring seal 42, as is conventional.

As shown, the hinge clamp 40 includes two generally semi-circular clamp parts 44 hinged together at one end and having radially extending tabs 46 at the other end that can pivot apart about the hinged ends. The clamp parts 44 define semi-circular channels 48 opening inwardly such that when the parts are clamped together the channels 48 combine to form a circular channel having a diameter slightly larger than the outer diameters of the flanges 20 and 38. The edges of the clamp parts 44 extend radially inward to an inner diameter less than the outer diameter of the flanges 20 and 38. The walls of the channels 48 are inclined so as to draw the flanges 20 and 38 together axially and compress the seal 42 between them.

The hose flange 38 is mated to the fitting flange 20 by placing each into the semi-circular channel 48 of one clamp part 44 with the seal 42 therebetween. The seal 42 defines an outer ring 50 sized to seat between the annular disks of the mating flanges 20 and 38 and an inner cylindrical portion 52 sized to fit within the opposing recesses and defining an axial opening 54. The seal 42 is preferably a resilient material so as to create a hermetic seal between the flanges 20 and 38 when clamped together. This is accomplished by hinging the clamp parts 44 closed and tightening the tabs 46 together securely by rotating a thumb screw 56 threaded onto a pivotal stud 58. With the nipple 18 of the fitting 10 threaded tightly into the inlet opening of the pump, an air-tight union is created between the intake hose and the pump.

As mentioned, the fitting 10 is designed to alternatively couple the pump to an intake hose via a threaded hose barb 60 (see FIG. 6). As is conventional, the hose barb 60 has a hex section 62 between a threaded end 64 and a barbed end 66 sized and configured so that the end of the intake hose can be slid tightly onto the hose barb 60, with the barbs resisting separation. With the fitting tightly threaded into the pump inlet opening (and the clamp removed), the threaded end 64 of the hose barb 60 can be threaded into the flange opening 24, rather than the inlet opening directly. Thus, alternating between a mating flange and threaded connection can be accomplished without removing the fitting and disturbing the seal at the inlet opening. Tightening the hose barb 60 to the fitting 10 and snugly fitting the hose to the barbed end 66 creates an air tight union between the intake hose and the pump.

It is envisioned that the fitting 10 can be included in a coupler kit supplied with the pump or sold separately. In a preferred form, the coupler kit includes the fitting 10, the hinge clamp 40, the seal 42 and the hose barb 60. The kit thus provides all the components necessary for connecting an intake hose to the pump via a mating flange connection and a threaded connection, as described above.

An illustrative embodiment of the present invention has been described above in detail. However, the invention should not be limited to the described embodiment. To ascertain the full scope of the invention, the following claims should be referenced.

What is claimed is:

1. A fitting at an inlet or discharge port of a pump or compressor, the fitting having an externally threaded nipple at one end with an outer diameter for threaded engagement with the port and a circular flange at an opposite end that is readily received in a channel of a hinge clamp, wherein an axial aperture extends between the ends of the fitting through an opening at the nipple and an internally threaded opening at the circular flange, the internally threaded opening having a diameter that is complementary to the outer diameter of the nipple and being readily engaged with a threaded end of a fitting attachment.

2. The fitting of claim 1, wherein the diameter of the threaded end is complementary to the diameter of the internally threaded opening at the flange.

3. The fitting of claim 1, wherein the attachment is a hose barb having the threaded end threaded into the threaded opening of the fitting.

4. The fitting of claim 1, wherein the internal threads are spaced axially from an outer face of the circular flange.

5. The fitting of claim 1, wherein the circular flange has a recessed center defining an annular disk.

\* \* \* \* \*